United States Patent [19]

Tokiwa

[11] Patent Number: 5,451,132
[45] Date of Patent: Sep. 19, 1995

[54] BAR TRANSPORTING DEVICE

[75] Inventor: Toru Tokiwa, Kanagawa, Japan

[73] Assignee: Amada Company, Limited, Japan

[21] Appl. No.: 265,624

[22] Filed: Jun. 24, 1994

Related U.S. Application Data

[63] Continuation of Ser. No. 920,429, Aug. 26, 1992, abandoned.

[30] Foreign Application Priority Data

Jan. 24, 1991 [JP] Japan .................. 3-007191

[51] Int. Cl.6 .................................. B21D 43/20
[52] U.S. Cl. .................... 414/225; 414/416; 414/751
[58] Field of Search ............ 414/22.62, 225, 416, 414/732, 736, 746.1, 746.8, 751, 900, 331; 294/81.2, 81.54, 81.6, 81.61, 81.62

[56] References Cited

U.S. PATENT DOCUMENTS

| 3,575,302 | 4/1971 | Cafolla ........................ 414/732 |
|---|---|---|
| 3,810,404 | 5/1974 | Stolzer . |
| 4,300,672 | 11/1981 | Millar et al. .............. 414/746.8 X |
| 4,362,454 | 12/1982 | Kripzak ..................... 414/416 X |
| 4,453,873 | 6/1984 | Curti .......................... 294/81.62 X |
| 4,482,289 | 11/1984 | Inaba et al. ............... 294/81.2 X |
| 4,541,762 | 9/1985 | Tischler et al. ........... 414/416 X |
| 4,552,498 | 11/1985 | Dysarz ....................... 414/736 X |
| 4,676,425 | 6/1987 | Fujimura et al. .......... 414/746.8 X |
| 4,799,724 | 1/1989 | Rekers ....................... 294/81.62 X |
| 5,006,028 | 4/1991 | Jackson ..................... 414/751 X |
| 5,049,023 | 9/1991 | Knyazkin et al. ......... 414/416 X |
| 5,120,178 | 6/1992 | Ito ............................. 414/225 |
| 5,152,566 | 10/1992 | Blatt et al. ................ 294/81.2 |
| 5,181,824 | 1/1993 | Thomas ..................... 414/751 |

FOREIGN PATENT DOCUMENTS

| 0473518 | 5/1951 | Canada ...................... 294/81.62 |
|---|---|---|
| 0013033 | 7/1980 | European Pat. Off. . |
| 0384869 | 8/1990 | European Pat. Off. . |
| 0405064 | 1/1991 | European Pat. Off. . |
| 0407703 | 1/1991 | European Pat. Off. . |
| 2393743 | 1/1979 | France . |
| 2617145 | 12/1988 | France . |
| 2163101 | 7/1973 | Germany . |
| 2246073 | 3/1974 | Germany . |
| 3122241 | 4/1982 | Germany . |
| 8214127 | 1/1984 | Germany . |
| 8214126 | 1/1986 | Germany . |
| 3527950 | 2/1987 | Germany . |
| 3706122 | 9/1988 | Germany ................... 414/225 |
| 4018139 | 12/1990 | Germany . |
| 61-206709 | 9/1986 | Japan . |
| 2145209 | 11/1988 | Japan . |
| 0048148 | 2/1990 | Japan ......................... 414/225 |
| 1426929 | 9/1988 | U.S.S.R. .................... 294/81.2 |
| 8303086 | 9/1983 | WIPO . |
| 8400739 | 3/1984 | WIPO . |

*Primary Examiner*—Michael S. Huppert
*Assistant Examiner*—James W. Keenan
*Attorney, Agent, or Firm*—Wigman, Cohen, Leitner & Myers

[57] ABSTRACT

A bar transporting device for transporting bars into and out of a bar processing machine (63) which processes bars (B) of different shapes and dimensions. The bar transporting device (1) includes a shelf frame (7) provided with vertically arranged pallet shelves (5) onto which pallets (3) loaded with bars (B) are to be removably stored, a vertically movable elevating device (21) provided at one end of the shelf frame (7) and adapted to transport the pallets (3) into and out of the shelf frame (7) and transport the pallets (3) between the shelf frame (7) and a bar feeding position (71), and a bar forwarding device (77) for transporting the bars (B) between the pallet (3) removed from the shelf frame (7) and positioned at the bar feeding position (71) by the elevating device (21), and the bar processing machine (63).

8 Claims, 8 Drawing Sheets

BAR TRANSPORTING DEVICE

This is a continuation application Ser. No. 07/920,429 filed on Aug. 26, 1992, now abandoned.

TECHNICAL FIELD

This invention relates to a bar transporting device for transporting bars into and out of a bar processing machine such as a sawing machine and for restoring the bars to the original positions when necessary.

BACKGROUND ART

In the prior art, a bar transporting device for transporting bars into and out of a bar processing machine such as a sawing machine is disclosed in Japanese Patent 90-145209 (A). Furthermore, U.S. Pat. No. 4,362,454 and DE Patent 4018139 (A1) seem to relate to the present invention.

When an elongated bar is processed to a predetermined length by the bar processing machine such as a sawing machine, there may be residual bars. The residual bars must be disposed of or stored again for reuse. As described above, the bars must not only be transported into the bar processing machine but must also be carried from the machine and stored.

In addition, there is a need to automatically transport S bars of different shapes and/or dimensions into and out of the bar processing machine in order to cope with, or be prepared for factory automation requiring little or no labour and for low volume, multivariety production of bars.

DISCLOSURE OF INVENTION

In view of the .above-mentioned need a bar transporting device of the present invention for transporting bars into and out of a bar processing machine includes: a shelf frame provided with vertically arranged shelves onto which individual pallets transporting bars are accommodated and removed therefrom; a vertically movable elevating device provided at one end of the shelf frame and adapted to transport the pallets into and out of the shelf frame and transport the pallets between the shelf frame and a bar feeding position; and a bar forwarding device for transporting the bars between the pallet, which has been removed from the shelf frame and positioned in the bar feeding position by the elevating device, and the bar processing machine.

The pallet is positioned on one of the shelves or removed from the shelf by vertically moving and positioning the elevating device at a position relative to the shelf which is at a certain height. After the elevating device has transported the pallet from the pallet shelf, the elevating device moves vertically to transport the pallet to the bar feeding position. The bar forwarding device then picks up one of the bars carried on this pallet and feeds the bar to the bar processing device.

When the bar is processed by the bar processing machine so that a residual bar results, the bar forwarding device can pick up and transport the residual bar, if required, from the bar processing machine onto a pallet located in the bar feeding position. The pallet is then stored on the prior pallet shelf by means of the elevating device.

Therefore, the bars of different shapes and/or dimensions can be automatically transported into and out of the bar processing machine. This satisfies the above-mentioned need.

BEST MODE FOR CARRYING OUT THE INVENTION

The present invention will now be described in detail through embodiments with reference to the accompanying drawings.

Figure 1:
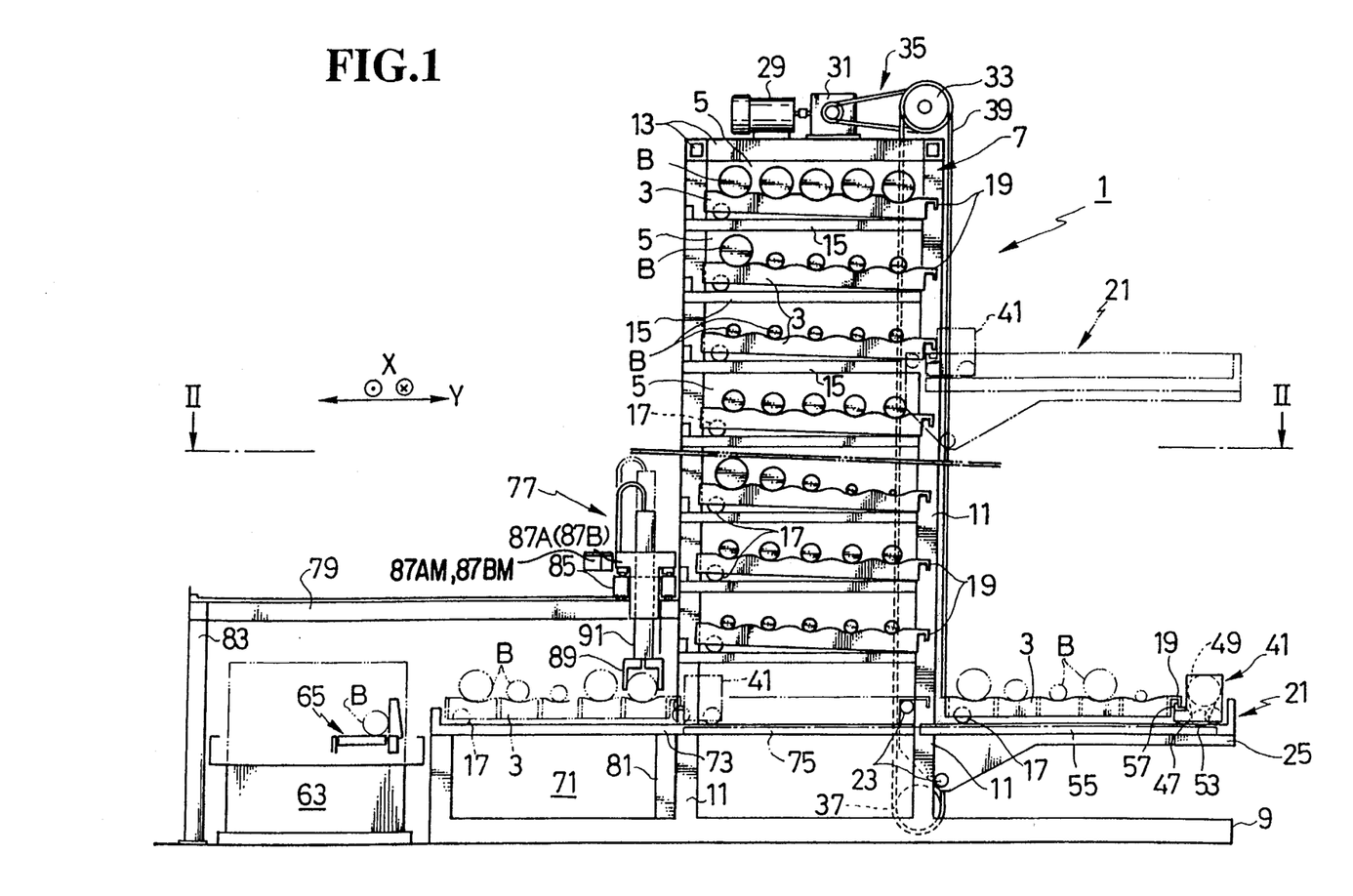
FIG. 1 is a sectional elevation of a first embodiment of the device of the present invention, taken along line I—I in FIG. 2.
Figure 2:
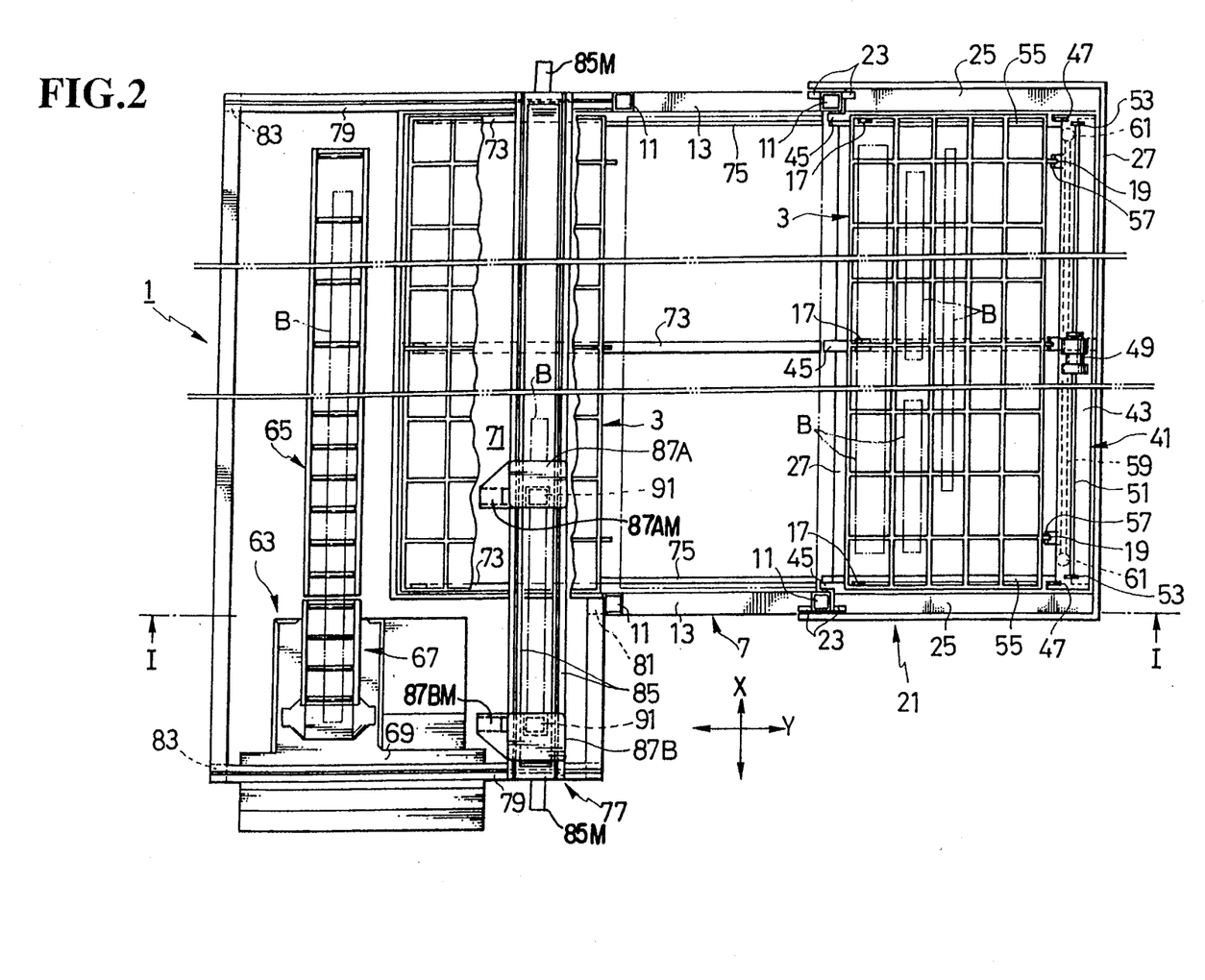
FIG. 2 is a sectional plan view taken along line II—II in FIG. 1.

Referring to FIGS. 1 and 2, a bar transporting device 1 in an embodiment of the present invention includes a shelf frame 7 provided with a plurality of vertically arranged pallet shelves 5 each of which removably accommodates a pallet 3 transporting elongated bars B of various shapes, for example, square or round.

The shelf frame 7 is a frame structure in the shape of a parallelepiped, consisting of a plurality of upright columns 11 supported on a base 9, tie beams 13 connecting the columns 11, and horizontal pallet supporting rails 15. The horizontal supporting rails 15 act as pallet shelves 5 in the shelf frame 7. Thus, a plurality of pallet shelves 5 are vertically arranged in the frame 7.

The pallet 3 is formed as a grid constructed of plates to provide a rectangular shape as shown in FIG. 2. As shown in FIG. 1, the upper surface of the pallet 3 is formed with a plurality of depressions suitably spaced in the Y direction to stably transport the elongated bars extending in the X direction (the direction perpendicular to the drawing). The pallet 3 is provided with a plurality of rollers 17 at a central and both side portions of a rear part (the left side in FIGS. 1 and 2) to provide smooth movement in the Y direction and, at a front part, with a plurality of hooks 19 which are engaged or disengaged vertically from the bottom. Hence, the pallet 3 inclines when stored on the pallet shelf 5, while the front part of the pallet 3 is a little lower than the rear part with a bottom edge of the front part contacting the pallet supporting rails 15.

Therefore, the pallet 3 is usually maintained in an immobile condition by contact friction.

An elevating device 21 is disposed in front of the shelf frame 7. The elevating device 21 moves vertically to transport the pallet 3 into and out of each pallet shelf 5.

The shape of the elevating device 21 is almost a rectangle. That is, the elevating device 21 is formed in a rectangular shape by two vertically movable elevating bases 25 guided through a plurality of guide rollers 23 along the columns 11 at both sides of the front end of the shelf frame 7 and a plurality of connecting members 27 which integrally connect the elevating bases 25.

A motor 29 for moving the elevating device 21 along the front columns 11 is mounted on an upper portion of the shelf frame 7. The motor 29 drives a final reduction gear 31. The final reduction gear 31 is connected through a power transmission mechanism 35, which may be comprised of chains, timing belts, or the like, to two sprockets 33 disposed one at each side of the upper portion of the shelf frame 7 so that the sprockets 33 can be driven by the motor 29. A pair of follower sprocket 37 are provided at the foot of the shelf frame 7, opposing the upper sprockets. A pair of chains 39 run around the upper and lower sprockets 37. The chains 39 are connected to the elevating bases 25 of the elevating device 21.

Therefore, the elevating device 21 is moved vertically along the front columns by suitably controlling the rotation of the motor 29.

Positioning of the elevating device 21 at a height relative to a predetermined shelf 5 of the shelf frame 7 is, for example, (detailed drawings omitted) easily carried out by sensors mounted on the shelf frame 7 at heights corresponding to pallet shelves 5, and a dog mounted on the elevating device 21, so that the elevating device 21 stops when the one of the sensors is actuated by the dog.

The elevating device 21 is provided with a traverser 41 which is movable forward and backward (to the right and left in FIGS. 1 and 2) to transport the pallets 3 of the pallet shelves 5 in and out. The traverser 41 mainly consists of an elongated movable member 43 extending in the X direction and supported at both ends by the elevating bases 25. The movable member 43 is provided at both ends and at a central portion with rollers 47 which roll on guide portions 45 of the elevating bases 25 and a central guide portion 45 of the elevating device 21.

The movable member 43 of the traverser 41 is activated by a motor 49. A long rotating axis of the motor 49 extending in the X direction is rotatably supported by the movable member 43. Pinions 53 are attached to the ends of the rotating axis of the motor 49 and engages racks 55 formed on the elevating bases 25 and extending in the Y direction.

In order to transport the pallets 3 of the pallet shelves 5 in and out by the movement of the traverser 41 in the Y direction, the traverser 41 is provided with hooks 57 for engaging and disengaging the hooks 19 on the front portion of the pallet 3 from a lower portion. The hooks 57 of the traverser 41 are vertically movable with respect to the movable member 43. The hooks 57 may be vertically moved by actuators, one actuator for each hook. However, in this embodiment as shown in FIG. 2, all the hooks 57 are attached integrally to a vertically movable lifting member 59 provided on the movable member 59. Both ends of the lifting member 59 are connected to hook lifting actuators 61 such as air cylinders.

Hence, the hooks 57 of the traverser 41 are raised or lowered by activating the hook lifting actuators 61 with respect to the movable member 43 to engage or disengage the hooks 19 of the pallet 3.

As may be already understood from the above explanation, the elevating device 21 stops at a desired height corresponding to one of the pallet shelves 5 and draws the pallet 3 from the pallet shelves 5 by engaging the hooks 57 of the traverser 41 with the hooks 19 of the pallet 3 on the pallet shelf 5 and slightly lifting the front end of the pallet 3 and by driving the motor 49 for withdrawing the pallet 3 onto the elevating bases 25 of the elevating device 21.

Conversely, the pallet 3 supported on the elevating device 21 can be positioned on the pallet shelf 5 by pushing the pallet backward using the body of the traverser 41.

A bar processing machine 63 such as a sawing machine for processing the bars B lying on the pallet 3 is installed at the rear (the left side in FIGS. 1 and 2) of the shelf frame 7. The bar processing machine 63 is provided with a roller conveyor portion 65, a bar moving portion 67 for transporting the bars B in the longitudinal direction of the bar, and a bar processing portion 69 for processing the bars B. The details of the bar processing machine 63 are not explained here since a sawing machine is well known as an example of the bar processing machine 63.

In order to supply the bar processing machine 63 with the bars B, a bar feeding position or portion 71 is disposed adjacent to the bar processing machine 63. The bar feeding position 71 is a location at which the pallet 3 is positioned after removal from the pallet shelf 5 and, in this embodiment, being passed through the lower portion of the shelf frame 7 by the elevating device 21. The bars B are fed from this bar feeding position 71 to the bar processing machine 63.

In order to forward the pallet 3 from the elevating device 21 to the bar feeding position 71 and support the pallet 3 there, guide portions 73 extending from the lower portion of the shelf frame 7 up to the bar feeding position 71 are disposed for guiding the pallet forward and backward. Furthermore, racks 75 extending in the Y direction are provided in the lower part of the shelf frame 7 so that the elevating device 21 can pass through the lower part while the pinions 53 of the traverser 41 engages the racks 75.

Hence, the traverser 41 of the elevating device 21 can reciprocate through the lower part of the shelf frame 7 when the racks 55 of the elevating device 21 and the racks 75 in the lower part of the shelf frame 5 are at the same height. That is, the pallet 3 is moved by the traverser 41 to and fro between the elevating device 21 which is at the front of the shelf frame 7 and the bar feeding position which is at the rear of the shelf frame 7.

In order to feed the bar B from the pallet 3 into the bar processing machine, a bar forwarding device 77 is disposed above the bar feeding position 71. The bar forwarding device 77 may be an overhead crane, however in this embodiment, it is designed as mentioned below.

As can be seen from FIGS. 1 and 2, horizontal guide rails 79 are provided over both the bar processing machine 63 and the bar feeding position 71. The guide rails 79 are supported at their ends by front supports 81, which are integrally attached to the shelf frame 7, and rear supports 83.

The outside guide rails 79 support a movable base 85 at its ends. The movable base 85 extends parallel to the bars B on the pallet 3, or in the X direction, and moves forward and backward, or in the Y direction. The movable base 85 is reciprocated along the guide rails 79 by suitably controlling a servo motor 85M for driving the base 85 to move in the Y direction. The controlling of the servo motor positions the base 85 over the bar B lying on the roller conveyor portion 65 of the bar processing machine 63.

Furthermore, first and second carriage 87A and 87B are supported by the movable base 85 movably in the longitudinal direction of the bars B (in the X direction). Each carriage 87A (87B) is provided with a vertically movable lifting arm 91 which has at a lower end a bar holding portion 89 for catching the bar B.

The carriages 87A, 87B can be moved independently along the movable base 85 by independently controlling servo motors 87AM, 87BM, respectively, one mounted on each carriage 87A (87B), for driving the carriage. The carriages 87A, 87B can also be moved simultaneously in the same direction by synchronously driving the servo motors.

The movements of the carriage 87A, 87B are controlled to adjust spacing between them, so that the bar holding portions 89 of the carriages 87A, 87B can catch the bars B of various lengths. After being gripped by the bar holding portions 89, the bar B is moved, when necessary, in the longitudinal direction of the bar by moving the carriages 87A and 87B simultaneously in the same longitudinal direction.

The bar holding portions 89 act as clampers for clamping the bars B, and are similar to general robot hands. Therefore, details of clamping and unclamping the bar B are not explained here.

The bar holding portion 89 may not be the clamper. Devices other than the clamper may be used instead. For example, an L-shaped hook which supports the bar B from the bottom can be used.

The lifting arms 91 are moved by a hydraulic cylinder (not shown).

The bar forwarding device is designed as explained above, so that the bars B are fed from the bar feeding position 71 into the bar processing machine 63 as mentioned below.

After the bar B lying on the pallet 3 has been held by the bar holding portions 89 of the carriages 87A, 87B and lifted by actuating the lifting arms 91, the movable base 85 is positioned above the roller conveyor portion 65 of the bar processing machine 63. Then, the lifting arms 91 are lowered, and the bar holding portions 89 are released to position the bar B on the roller conveyor portion 65 of the bar processing machine 63.

In the case that a plurality of short bars B are arranged in a row in the longitudinal direction of the bar, the carriages 87A, 87B are moved along the movable base 85 to transport all the short bars in the longitudinal direction of the bars B. Thus, all the bars B are fed, piece by piece, into the bar processing machine 63.

Similarly, bars (residual ones) at the bar processing machine 63 can be returned onto the pallet 3 positioned at the bar feeding position 71, and residual short bars at the bar processing machine 63 can be stored in a row on the pallet 3.

As can be understood from the above explanation of this embodiment, the elevating device 21 stops at the height in the front of the pallet shelf 7 and withdraws the pallet 3 from the predetermined shelf 5, and then positions it at the bar feeding position 71.

After it, the bar forwarding device 77 transports the bars B in turn from the pallet 3 positioned at the bar feeding position 71 into the bar processing machine 63. Furthermore, the residual bars produced during the processing of the bars B can be removed and positioned on the pallet 3 located in the bar feeding position 71.

While the bars B are removed from the pallet 3 withdrawn from the elevating device 21 and located in the bar feeding position 71, and fed into the bar processing machine 63 for processing, the elevating device 21 is able to move vertically, if the traverser 41 has returned to the elevating device 21.

Hence, it is possible to withdraw, for example, one empty pallet 3 from the pallet shelf 5 onto the elevating device 21 and then position the elevating device 21 at a required height. After it, the empty pallet 3 is loaded with new bars using, for example, a lifting machine such as a crane, hoist, or fork lift, for the preparation for future bar processing. The pallet 3 loaded with new bars may be stored on the pallet shelf 5, if necessary.

According to the present invention, a large number of bars B of several shapes and dimensions are loaded on the pallets 3 and stored in a relatively small area, and the pallets are removed when necessary so that the bars lying on the pallets are fed into the bar processing machine 63. Furthermore, the residual bars produced during the processing of bars are automatically removed from the bar processing machine, and the empty pallets are easily supplied with new bars for future processing.

Figure 3:
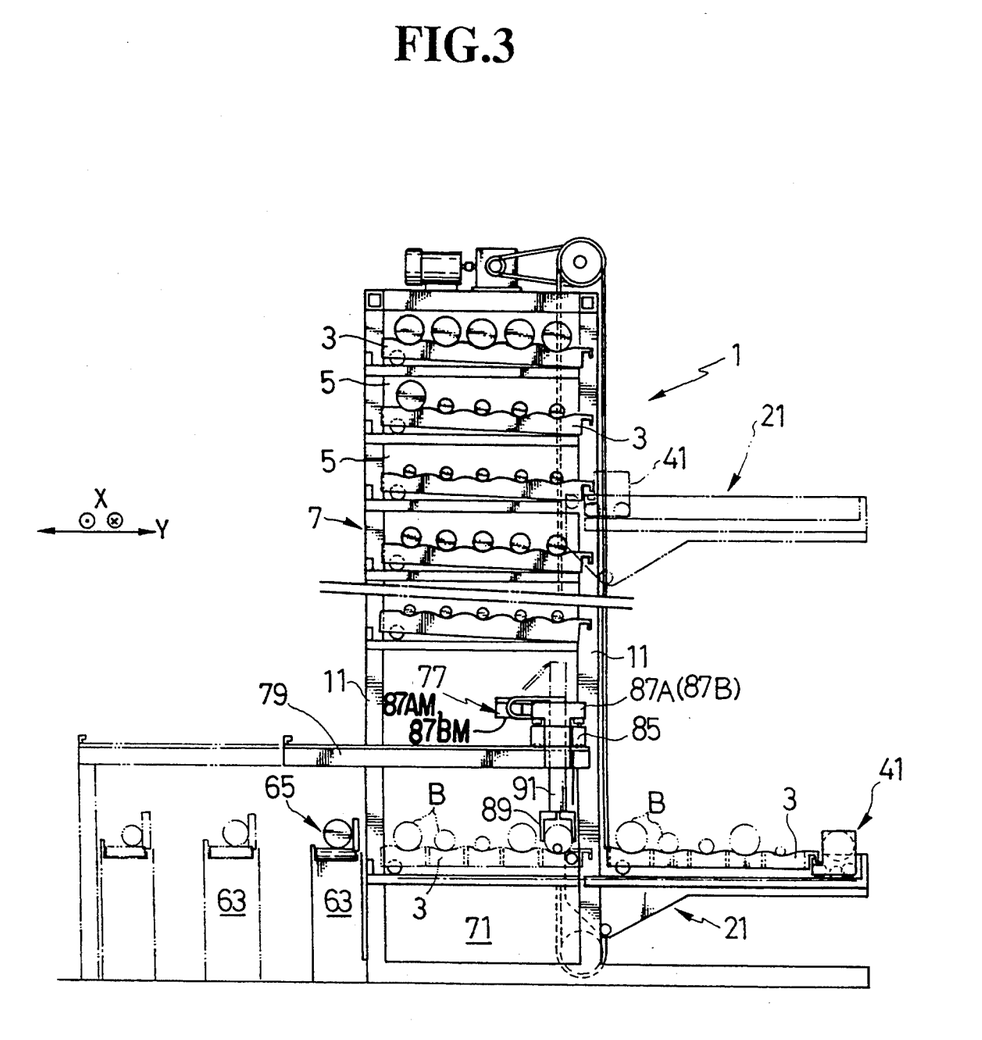
FIG. 3 is a sectional elevation of a second embodiment of the device of the present invention, similar to FIG. 1.

FIG. 3 shows a second embodiment of the bar transporting device 1 of the present invention. The point different from the first embodiment is that a bar feeding position 71 is disposed in a lower part of a shelf frame 7 and that a bar forwarding device 77 moves into and out of the lower part of the shelf frame 7 in this embodiment.

The configuration other than that point is the same as that of the first embodiment. Components with the same function are therefore assigned the same reference characters in this embodiment, and a further detailed explanation is omitted.

In the second embodiment, pallet shelves 5 becomes less in number, and however, the bar transporting device 1 occupies a floor area smaller than that of the first embodiment. Therefore, it is possible to install a plurality of bar processing machines 63 in the same floor area as that in the first embodiment, and as a result more bars B are processed at the same time.

Figure 4:
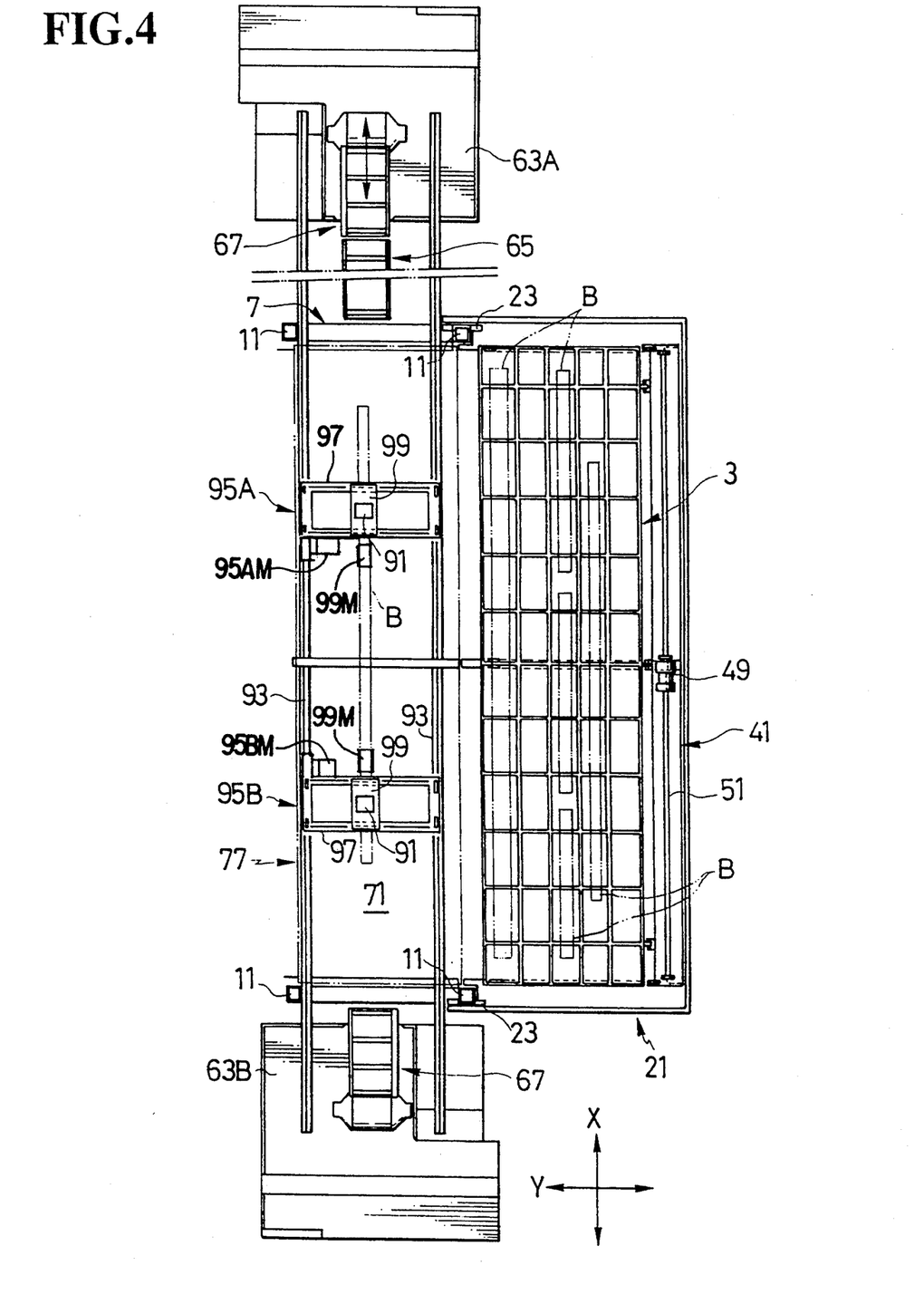
FIG. 4 is a sectional plan view of a third embodiment of the device of the present invention, similar to FIG. 2.

FIG. 4 is a plan showing a third embodiment of the present invention, and is similar to FIG. 2 of the first embodiment. In this third embodiment, both a bar forwarding device 77 and a bar feeding position 71 are disposed in the lower part of the shelf frame 77.

A pair of guide rails 93 extending in the X direction parallel to a longitudinal direction of bars B are provided in the lower part of the shelf frame 77. Ends of the guide rails 93 project from both ends of the shelf frame 7 to some extent in the X direction. First and second bar processing machines 63A, 63B are disposed under the end portions of the guide rails 93.

First and second carriages 95A, 95B are movably mounted on the pair of guide rails 93 by respective drive mechanisms 95AM, 95BM. Each of the first and second carriages 95A, 95B is provided with slide base 97 which is movable in the X direction along the guide rails 93. The slide base 97 is formed as a rectangular frame. A slider 99 is movably mounted on each slide base 97. The slider 99 is reciprocated in the Y direction on the slide base 97 by actuating a servo motor 99M mounted on the slider 99. The slider 99 is provided with a vertically movable lifting arm 91 to a lower end of which a bar holding portion (not shown) is attached, the same as in the first embodiment.

In the above design of this third embodiment, after the elevating device 21 has withdrawn the pallet 3 from the pallet shelf 5 of the shelf frame 7 onto the elevating device 21 itself and descended to the lowest position, it pushes the pallet 3 into the bar feeding position 71 under the first and second carriages 95A, 95B.

The slide bases 97 of the carriages 95A, 95B are moved in the X direction so that the slide bases 97 are suitably spaced each other to hold the bar B of a length, and the sliders 99 are moved in the Y direction on the slide bases 97 until they come to a position above one of the bars B on the pallet 3 positioned in the bar feeding position 71.

After it, the lifting arms 91 are lowered to hold the bar by the bar holding portions and then raised. The slide bases 97 are, then, moved simultaneously in the X direction to feed the bar into either one of the first or second bar processing machine 63A or 63B. Another bar is then fed to the other bar processing machine 63B or 63A so that the first and second bar processing machines 63A, 63B can process the bars B at the same time.

When the bars B are so relatively short that each carriage 95A, 95B can hold the short bar B, the carriages 95A, 95B are controlled individually to supply the carriages 95A, 95B respectively with short bars B at the same time.

As being explained above, the first and second bar processing machines 63A, 63B are, in this embodiment, used independently of each other in relation with the diameter, length and so on of the bars B, or used synchronously to process the plurality of bars at the same time. The bar transporting device of this third embodiment saves the space and processes the bars with efficiency.

Figure 5:
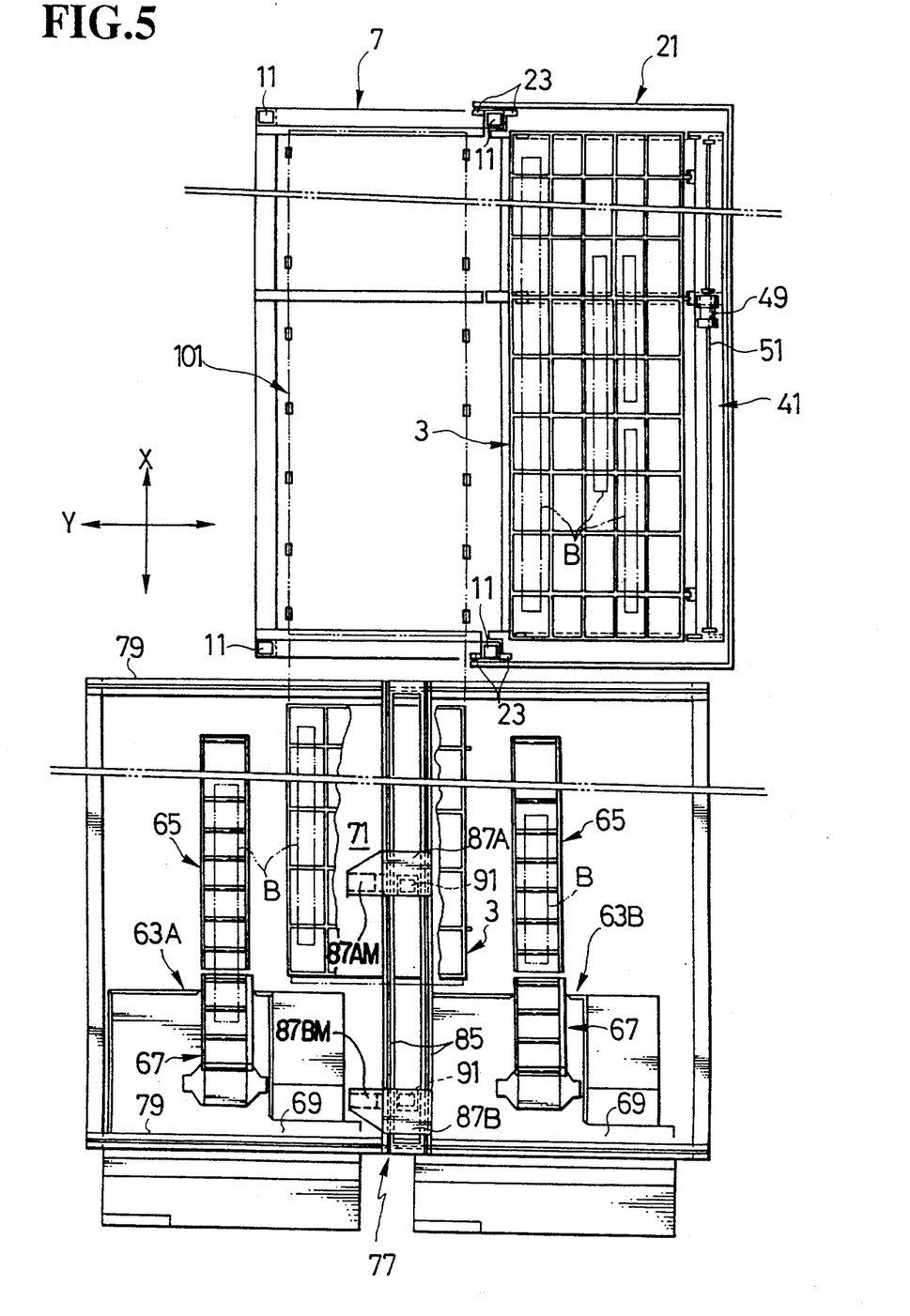
FIG. 5 is a sectional plan view of a fourth embodiment of the device of the present invention, similar to FIG. 2.

FIG. 5 is a plan showing a fourth embodiment of the present invention, and is similar to FIG. 2 of the first embodiment.

In this fourth embodiment, a bar feeding position 71 is located at one side (in the X direction) of a shelf frame 7, and first and second bar processing machines 63A, 63B are disposed at the sides (in the Y direction) of the bar feeding position 71.

As the bar forwarding position 71 is located at the side of the shelf frame 7 in this embodiment, a pallet forwarding device 101 for transporting pallets 3 in the X direction is provided between a lower portion of the shelf frame 7 and the bar feeding position 71.

The pallet forwarding device 101 serves to transport the pallet 3 located at the lower portion of the shelf frame 7 by the elevating device 21 into the bar feeding position 71, or transport the pallet 3 from the bar feeding position 71 into the lower portion of the shelf frame 7. The pallet forwarding device 101 mainly consists of an endless slat or chain conveyor extending in the X direction.

A bar forwarding device 77 for transporting and feeding the bars B from the pallet 3 positioned in the bar feeding position 71 into the first and second bar processing machines 63A, 63B respectively disposed at the sides of the bar feeding position 71, is so designed as similar to that of the first embodiment. Therefore, components with the same function are assigned the same reference characters, and a further detailed explanation will be omitted.

In this fourth embodiment, also, an effect similar to those of the other embodiments mentioned above is obtained.

Figure 6:
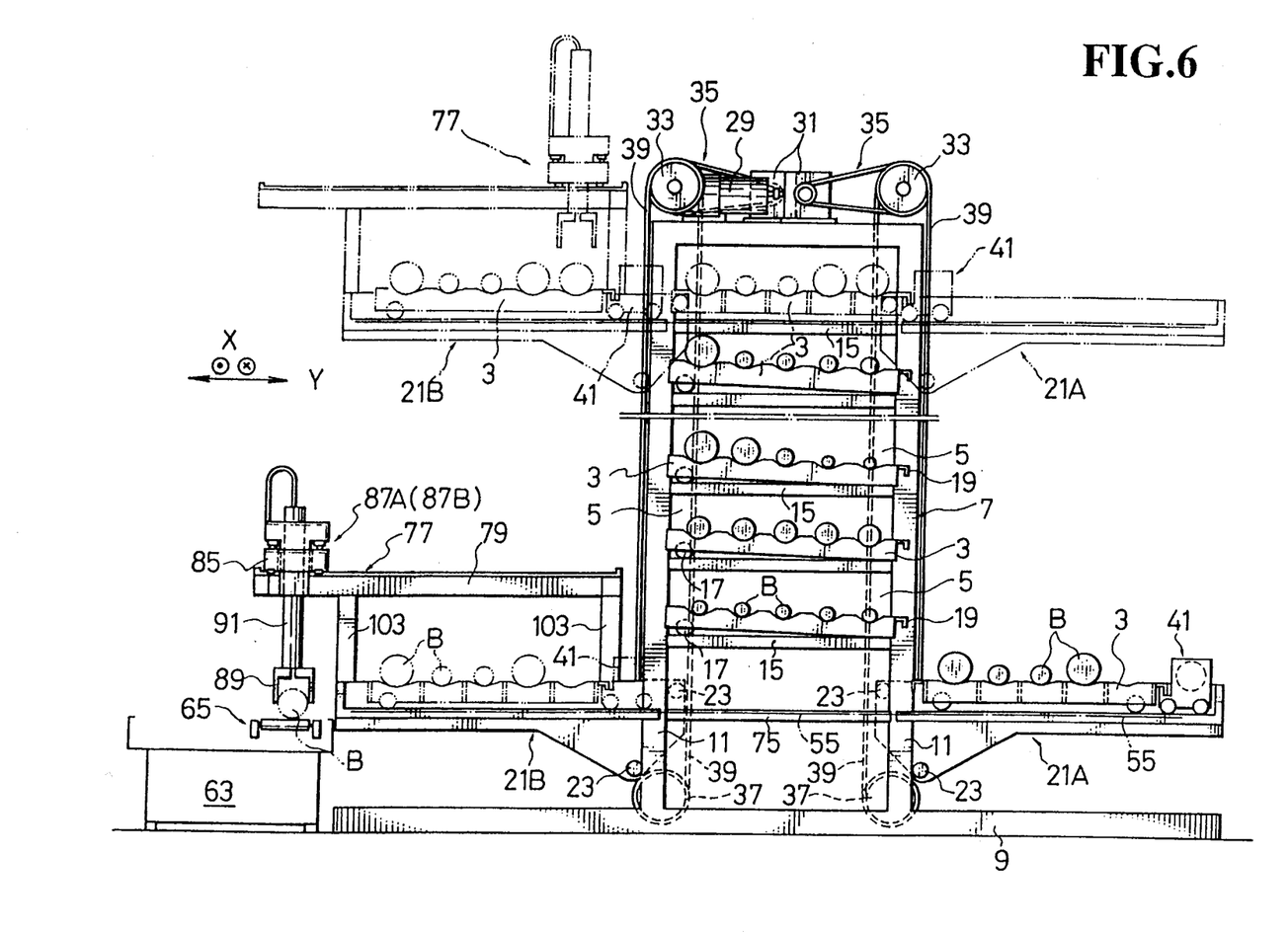
FIG. 6 is a sectional elevation of a fifth embodiment of the device of the present invention, similar to FIG. 1.

FIG. 6 is a sectional elevation for showing and explaining a fifth embodiment of the present invention, and is similar to FIG. 1 of the first embodiment.

In this fifth embodiment, a first vertically movable elevating device 21A is provided at the front end of a shelf frame 7 while a second vertically movable elevating device 21B is provided at the rear end of the shelf frame 7. A bar forwarding device 77 is mounted on the second elevating device 21B, so that the second elevating device 21B serves as a bar feeding position.

The first elevating device 21A of this embodiment is the same as the elevating device 21 in the first embodiment. Furthermore, the second elevating device 21B is almost the same as the first elevating device 21A except that the second elevating device 21B is not provided with a traverser 41. The second elevating device 21B is symmetrically constituted and disposed with the first elevating devices 21A, and the mechanism for vertically moving the first and second elevating devices is also symmetrical. Therefore, an explanation of the portions of the first and second elevating positions 21A and 21B of which function is the same as those of the elevating device 21 of the first embodiment is omitted, and same reference characters are used for these portions.

The bar forwarding device 77 is mounted on the second elevating device 21B through a plurality of, for example, four supports 103 secured to the ends of the second elevating device 21B. The constitution of the bar forwarding device 77 is therefore the same as that shown in the first embodiment except for the supports 103, and the components which function the same are assigned the same reference characters and are not explained.

In this fifth embodiment, furthermore, pallet bearing rails 15 of the pallet shelves 5 are formed with racks (not shown) which engage pinions 53 of a traverser 41 disposed on the first elevating device 21A so that the traverser 41 can enter each pallet shelf 5 of the shelf frame 7 and push a pallet 3 stored on each pallet shelf 5 onto the second elevating device 21B positioned at the rear of the shelf frame 7.

According to the design mentioned above in this fifth embodiment, the traverser 41 mounted on the first elevating device 21A can push the pallet 3 on the pallet shelf 5 onto the second elevating device 21B when both the first and second elevating devices 21A and 21B are respectively positioned in the front and rear of the pallet shelf 5 at the same height.

After the pallet has been pushed onto the second elevating device 21B, the second elevating device 21B is lowered to its lowest position. Then, the bar forwarding device 77 picks up some of bars B supported on the pallet 3 and feeds them piece by piece to the bar processing machine 63.

After the bars B have been processed by the bar processing machine 63, the pallet 3 on the second elevating device 21B is moved through the lower portion of the shelf frame 7 onto the first elevating device 21A by the traverser 41.

When the bars B removed from the pallet 3 on the second elevating device 21B and fed to the bar processing machine 63 are processed, the first elevating device 21A can withdraw an empty pallet 3 from a predetermined pallet shelf 5 for storing new bar pieces to be processed and can position the pallet 3 on the original pallet shelf 5.

The bar forwarding device 77 is mounted on the second elevating device 21B in this fifth embodiment. However it may be positioned at a predetermined location so as to move vertically between the guide rails 79 provided at both ends of the bar forwarding device 77, the same as in the first embodiment.

The device 1 of this fifth embodiment gives an effect similar to that obtained in the other above embodiments.

Figure 7:
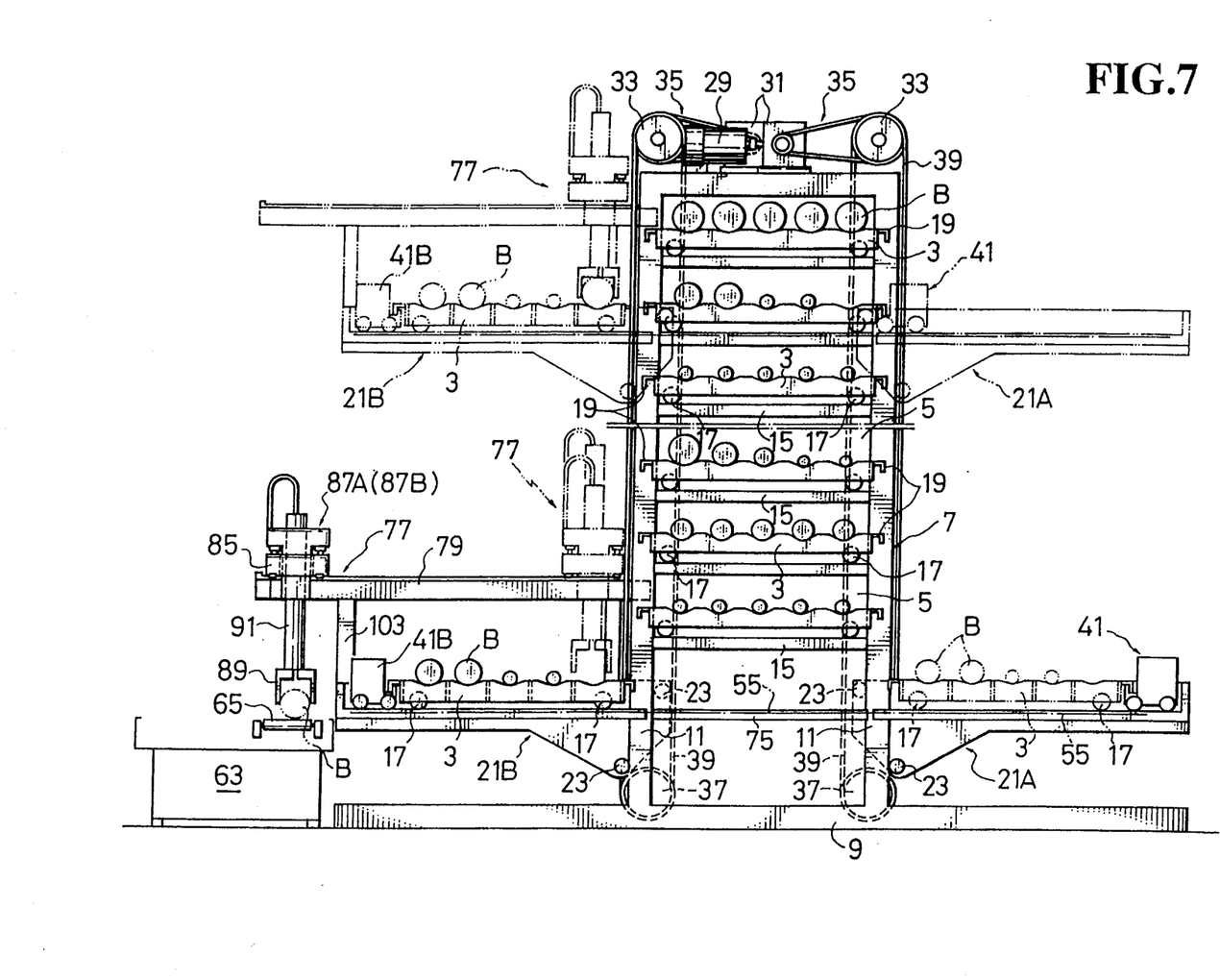
FIG. 7 is a sectional elevation of a sixth embodiment of the device of the present invention, similar to FIG. 1.

FIG. 7 shows a sixth embodiment of the present invention. In this embodiment, a second traverser 41B is attached to the second elevating device 21B of the fifth embodiment. The second traverser 41B moves forward and backward to transport a pallet 3 into and out of each pallet shelf 5. The pallet 3 is provided with hooks 19 at the front and rear ends.

The configuration other than the hooks is the same as that of the above fifth embodiment. Components with the same function are therefore assigned the same reference characters, and further explanation is omitted.

As the second traverser 41B attached to the second elevating device 21B can remove the pallet 3 from any pallet shelves 5 in this embodiment, the second elevating device 21B can be used exclusively for removing the pallet 3 from any pallet shelves 5 and feeding the bars B on the pallet 3 to the bar processing machine 63, or returning the empty pallets 3 to the pallet shelves 5 after all the bars B on the pallets 3 have been fed to the bar processing machine 63.

On the other hand, the first elevating device 21A can be used exclusively for receiving the empty pallets 3 from the second elevating device 21B for storing new bars on the empty pallets and placing the pallets 3 with the new bars onto the pallet shelves 5, or taking out the empty pallets 3 of the pallet shelves 5 for storing new bars on the empty pallets 3 and returning the pallets 3 with the new bars to the prior pallet shelves 5.

That is, in this sixth embodiment, the pallets 3 can be used while being circulated clockwise or counterclockwise in FIG. 7. Thus, the feeding of bars B to the bar processing machine 63 and the charging of new bars onto the pallet 3 are carried out efficiently.

In the conflagration of this sixth embodiment as well as the fifth embodiment, furthermore, the bar forwarding device 77 can pick up one required bar B on the pallet 3 withdrawn by the second elevating device 21B and then, after the pallet 3 has been transported onto the original pallet shelf 5, descend to the lowest position to feed the bar into the bar processing machine 63.

Figure 8:
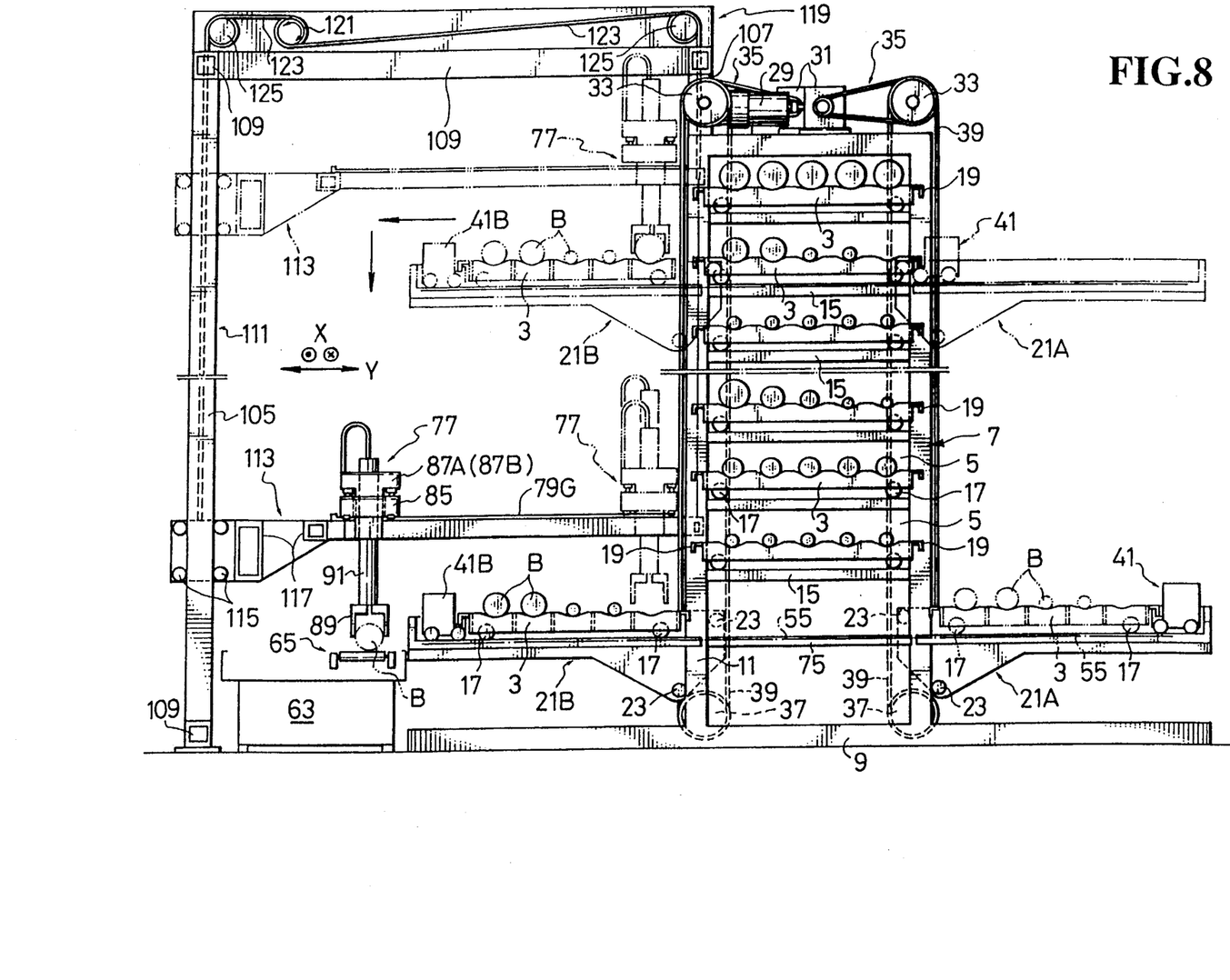
FIG. 8 is a sectional elevation of a seventh embodiment of the device of the present invention, similar to FIG. 1.

FIG. 8 is a sectional elevation showing a seventh embodiment of the present invention, similar to FIG. 1.

In this seventh embodiment, configuration of the bar transporting device 1 is similar to that of the sixth embodiment shown in FIG. 7. The different point is that the bar forwarding device 77 is vertically movable independently of the second elevating device 21.

A plurality of rear columns 105 (the left side in the drawing) and front columns 107 are disposed at the rear of the shelf frame 7. The front and rear columns 107, 105 are suitably connected to each other by a plurality of horizontal beams 109 to configure a frame structure 111 as a whole.

A vertically movable elevating frame 113 is disposed between the front and rear columns 107 and 105. The elevating frame 113 mainly consists of two guide rails 79G, which correspond to the guide rails 79 of the first embodiment, each extending in the Y direction, and a plurality of tie beams 117 which suitably connect the guide rails 79G. A proximal end of the elevating frame 113, or proximal ends of the guide rails 79G are guided by a plurality of guide rollers 115 along the rear columns 105 while a distal end of the elevating frame 113, or distal ends of the guide rails 79G are guided by a plurality of rollers (not shown) along the front columns 107.

A bar forwarding device 77 similar to those in the above explained embodiments, is slidably mounted on the guide rails 79G so that it can move forward and backward on the guide rails 79G in the Y direction. A driving device 119 for moving the elevating frame 113 vertically along the front and rear columns 107, 105 is provided on the upper portion of the frame structure 111. The driving device 119 has a drum 121 secured to the upper portion of the frame structure 111, and a plurality of chains or wires 123. The drum is rotated clockwise and counterclockwise by a motor (not shown). One end of each wire 123 is secured to the drum 121 while the other end is connected through guide roller 125 disposed on the upper portion of the frame structure 111, to the proximal or distal end of the guide rail 79G as shown in the drawing.

The other configuration is similar to the configuration of the sixth embodiment described above and shown in FIG. 8. Therefore, components with the same function are assigned the same reference characters, and a further detailed explanation will be omitted.

As can be understood from the above configuration in the seventh embodiment, the wires 123 are wound or reversed by actuating the driving device 119 causing the elevating frame 113 to rise or descend. Thus, the bar forwarding device 77 vertically moves, independent of and relative to the second elevating device 21B.

The bars B, in this seventh embodiment, can be fed from the pallet 3 positioned at the rear of the pallet shelve 5 into the bar processing machine 63.

The second elevating device 21B may be omitted as a modified example of this seventh embodiment. In this case, the pallet bearing rails 15 may have extendable mechanism so that they can extend backward and become short to the original length when necessary. In this modified example, the bar forwarding device 77 transports the bars B from the pallet 3 positioned at the bar feeding position, which is at the rear of the pallet shelf 5, into the bar processing machine 63.

As can be seen from the above embodiments, when the bar forwarding device 77 transports the bars B from the pallet 3 into the bar processing machine 63, the pallet 3 is positioned at the bar forwarding position which is at the rear or the side, or in the lower portion of the shelf frame 7, on the second elevating device 21B, or at the rear of the shelf 5 or shelf frame 7.

Industrial Applicability

As can be understood from the above explanation, the bar transporting device of the present invention can easily transport the pallets from the shelves 7 vertically arranged in the shelf frame 5 and feed bars B of several shapes and dimensions lying on each pallet 3 into the bar processing machine or machines 63, 63A, and 63B, and return the residual bars produced during the processing of the bars B onto the original pallet 3.

According to the present invention, therefore, many kinds of bars B are automatically transported into and out of the bar processing machines 63, 63A, and 63B, and automation with little or no man power for processing the bars by the bar processing machine 63 and saving of space for machinery are possible.

I claim:

1. A bar transporting device for transporting bars into and out of a bar processing machine, said bars stored on pallets, said device comprising:

(a) a shelf frame provided with vertically arranged pallet shelves onto which a plurality of pallets carrying bars are to be removably stored, each pallet capable of carrying a plurality of said bars;
(b) a means for transporting at least one of said pallets vertically, said means disposed on a side of said shelf frame;
(c) a device for moving at least one of said pallets between said pallet shelves and said transporting means, and between said transporting means and a bar feeding position;
(d) a bar forwarding device for transporting the bars between said pallet at said bar feeding position and a feeding device for feeding the bar into said bar processing machine, said bar forwarding device including:
  (i) a first guide rail disposed in the direction perpendicular to the bar on the pallet and between said bar feeding position and said feeding device;
  (ii) a movable base mounted slidably on said first guide rail;
  (iii) a second guide rail disposed on said movable base in the direction perpendicular to said first guide rail;
  (iv) a first carriage and a second carriage mounted slidably on said second guide rail, said first carriage and said second carriage movable independently of each other;
  (v) a first driving means and a second driving means, respectively, for moving said first carriage and said second carriage independently; and
  (vi) a vertically movable bar holding portion mounted on each of said first and second carriages for holding the bar, said vertically movable bar holding portion of said first carriage capable of holding a single bar independently of the vertically movable bar holding portion mounted on said second carriage.

2. The device of claim 1, wherein the bar feeding position is opposite to said elevating device with respect to said shelf frame.

3. The device of claim 1, wherein the bar feeding position is under said shelf frame.

4. The device of claim 1, wherein the bar feeding position is at a longitudinal side portion of said shelf frame.

5. A bar transporting device for transporting bars into and out of a bar processing machine, said bars stored on pallets, said device comprising:
(a) a shelf frame provided with vertically arranged pallet shelves onto which a plurality of pallets carrying bars are to be removably stored, each pallet capable of carrying a plurality of said bars;
(b) a means for transporting at least one of said pallets vertically, said means disposed on a side of said shelf frame;
(c) a device for moving at least one of said pallets between said pallet shelves and said transporting means, and between said transporting means and a bar feeding position;
(d) a bar forwarding device for transporting the bars between said pallet at said bar feeding position and a feeding device for feeding the bar into said bar processing machine, said bar forwarding device including:
  (i) a first guide rail disposed in the direction perpendicular to the bar on the pallet and between said bar feeding position and said feeding device;
  (ii) a movable base mounted slidably on said first guide rail;
  (iii) a second guide rail disposed on said movable base in the direction perpendicular to said first guide rail;
  (iv) a first carriage and a second carriage mounted slidably on said second guide rail, said first carriage and said second carriage movable along a full length of said second guide rail independently of each other;
  (v) a first driving means and a second driving means, respectively, for moving said first carriage and said second carriage independently; and
  (vi) a vertically movable bar holding portion mounted on each of said first and second carriages for holding the bar, said vertically movable bar holding portion of said first carriage capable of holding a single bar independently of the vertically movable bar holding portion mounted on said second carriage.

6. The device of claim 5, wherein the bar feeding position is opposite to said elevating device with respect to said shelf frame.

7. The device of claim 5, wherein the bar feeding position is under said shelf frame.

8. The device of claim 5, wherein the bar feeding position is at a longitudinal side portion of said shelf frame.

* * * * *